Mar. 13, 1923.
H. L. FERRIS.
LITTER CARRIER.
FILED JULY 26, 1920.
1,448,394.
4 SHEETS—SHEET 3.
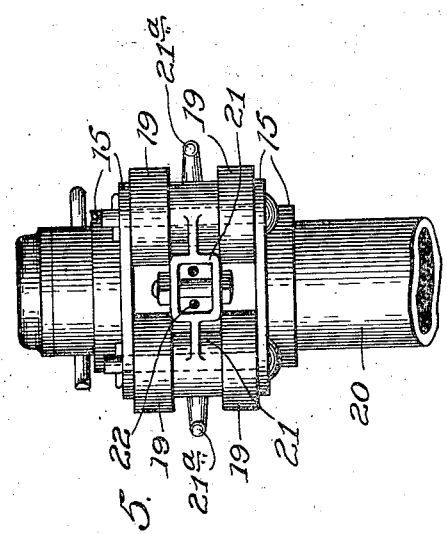
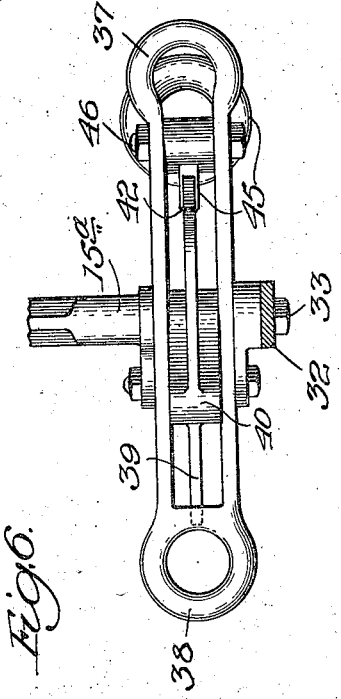
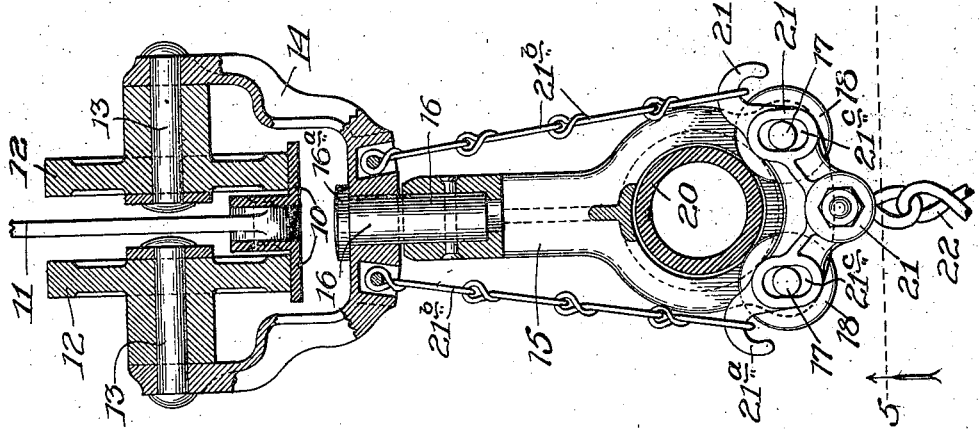
Inventor:
Henry L. Ferris,

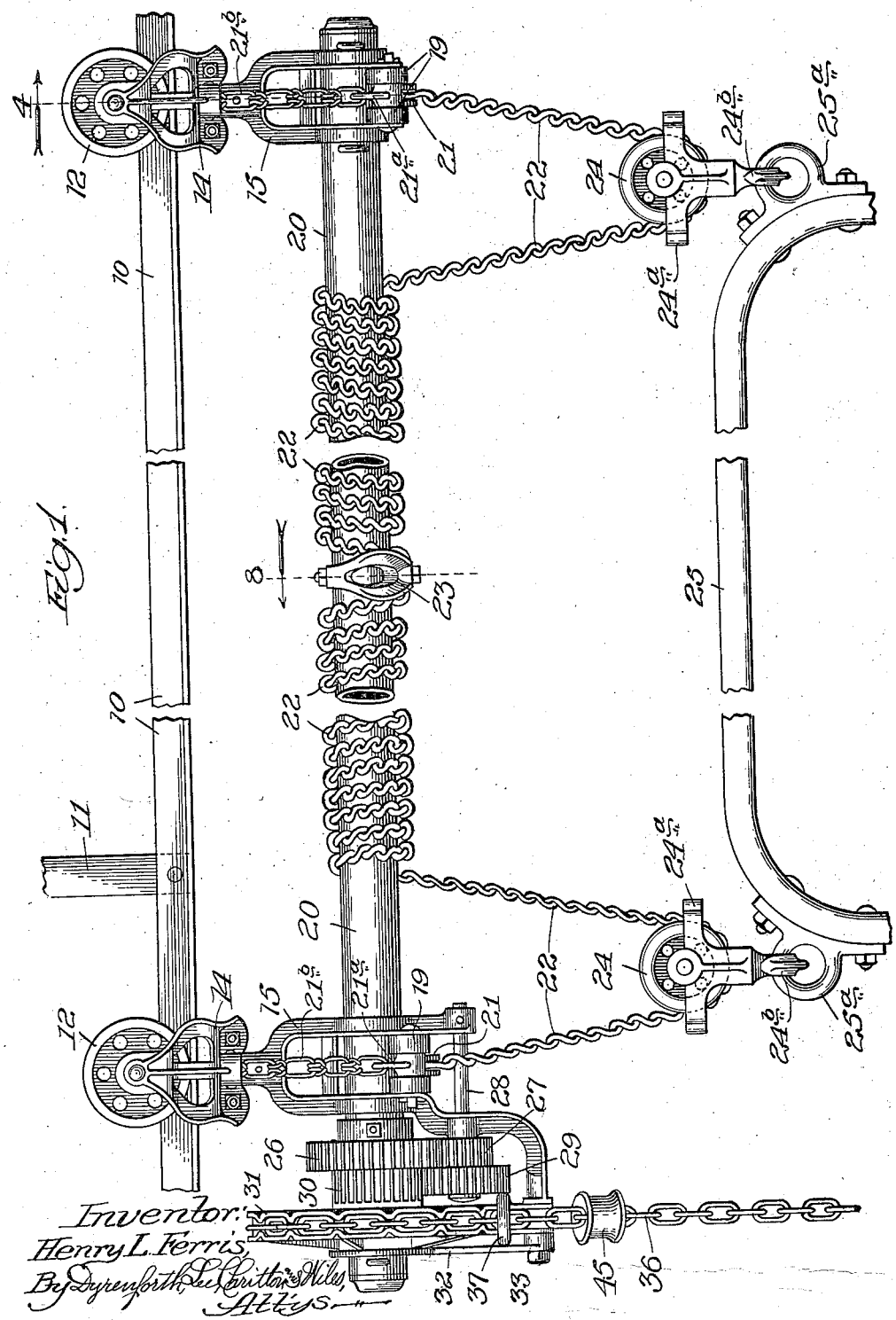

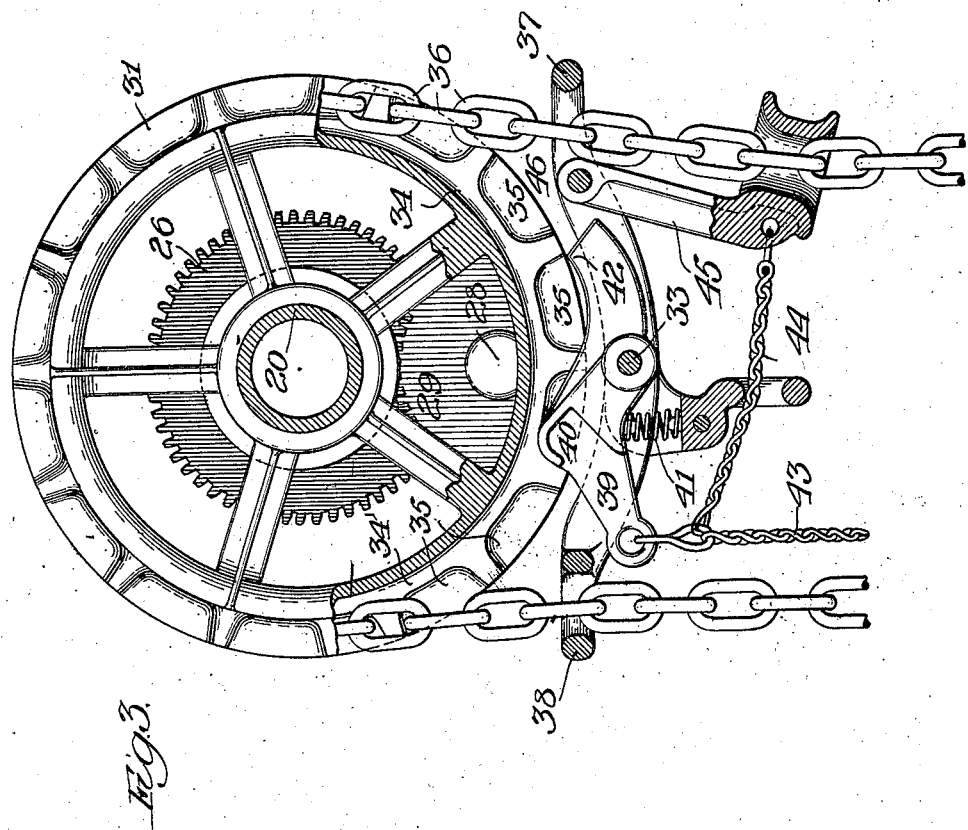
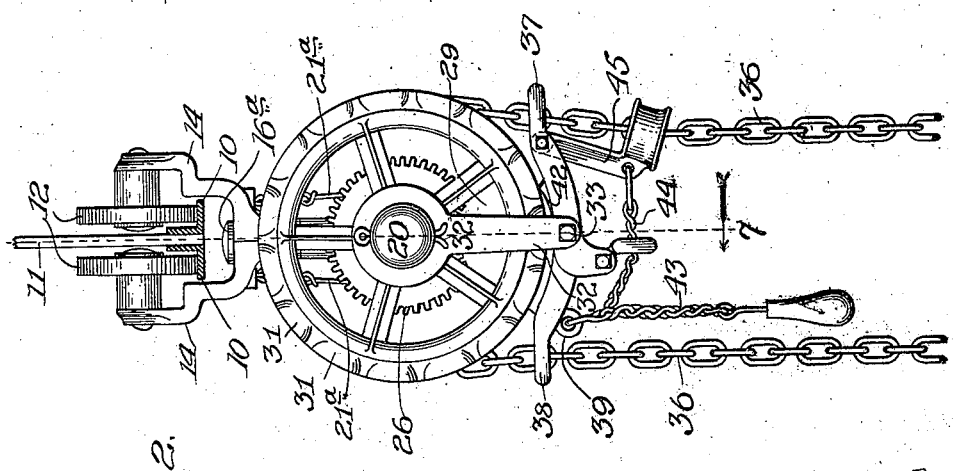

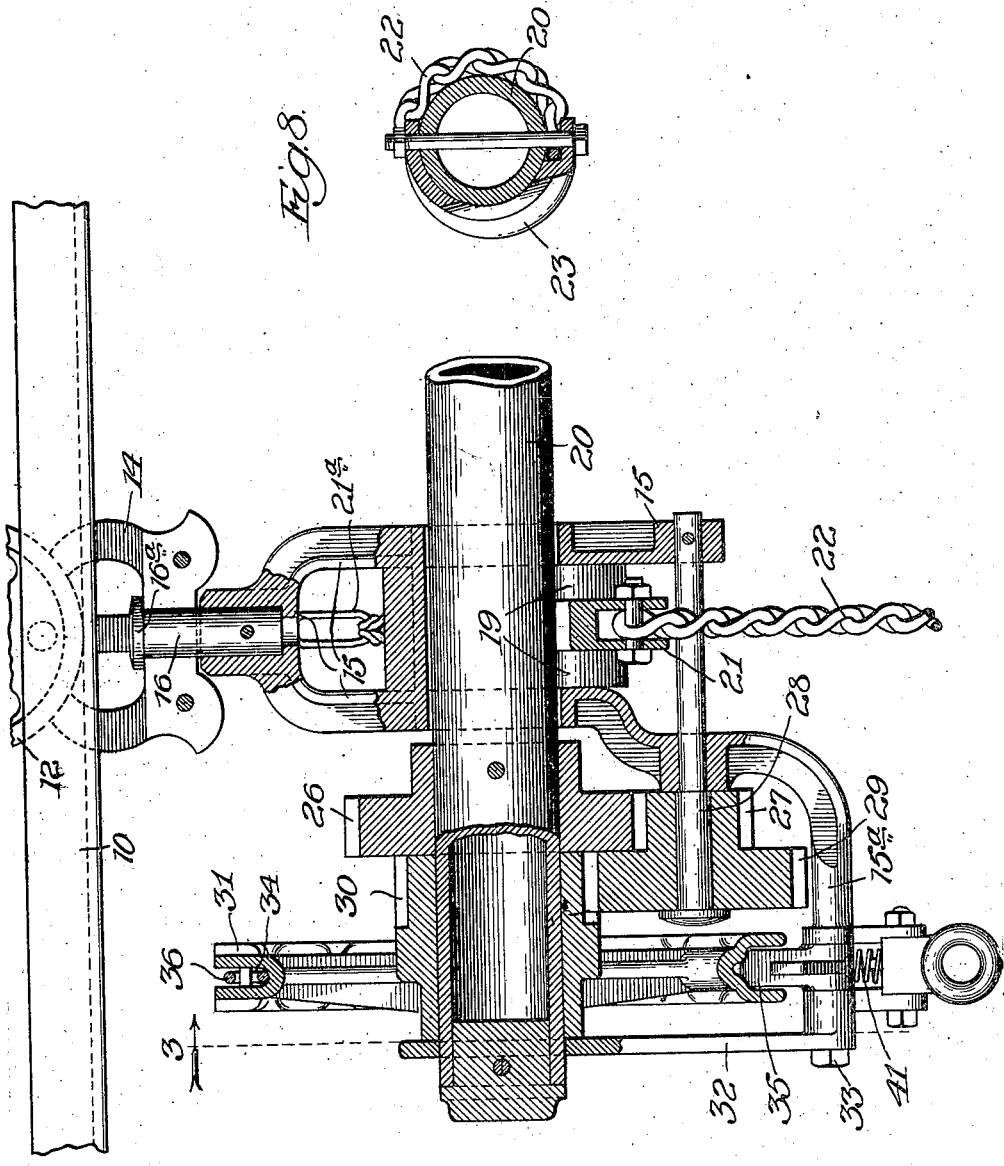

Patented Mar. 13, 1923.

1,448,394

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

LITTER CARRIER.

Application filed July 26, 1920. Serial No. 399,101.

*To all whom it may concern:*

Be it known that I, HENRY L. FERRIS, a citizen of the United States, residing at Harvard, in the county of McHenry and State of Illinois, have invented a new and useful Improvement in the Litter Carriers, of which the following is a specification.

This invention relates to litter carriers and is fully described in the following specification and shown in the accompanying drawings in which:

Fig. 1 is a side elevation of a litter carrier embodying my invention;

Fig. 2 is an end elevation of same;

Fig. 3 is an enlarged elevation similar to Fig. 2, but shown partly in section;

Fig. 4 is a vertical section on the line 4 of Fig. 1;

Fig. 5 is a view on the line 5 of Fig. 4;

Fig. 6 is a detail of the chain guide.

Fig. 7 is a vertical section on the line 7 of Fig. 2, and,

Fig. 8 is a section on the line 8 of Fig. 1.

The track for this litter carrier consists of two angles 10 placed back to back and secured together with supports 11 placed therebetween. Wheels 12 as shown in Fig. 4 are adapted to roll on the angles 10. These wheels are journaled on pins 13 which are carried by the truck 14.

A bearing 15 is hingedly mounted in the truck 14 by means of a pin 16 having a head 16$^a$ and carries pins 17 upon which are journaled rollers 18. A hollow shaft 20 passes thru the openings in the two bearings 15 and rests upon the rollers 18. An evener 21 lies between the rollers 18 as shown in Fig. 5 and has slotted openings 21$^c$ which act as guides and through which pass the pins 17. The members 21 also have a hook 21$^a$ at each side which engages a chain 21$^b$ by which it is suspended from the truck 14. One end of the chain 22 is attached to the bottom of each of the members 21 while the middle of the chain is secured to the shaft 20 by means of a cleat 23. Thus it will be seen that the weight carried by the outer ends of the chain 22 (see Fig. 1,) is applied thru the chains 21$^b$ to hanger 14 and is not carried by the shaft 20.

Sheaves 24 are carried by the loop thus formed in the chain 22 and these sheaves are carried in sheave blocks 24$^a$ having a hook 24$^b$ at their lower end by which they engage eyes 25$^a$ on the bail 25. Thus various receptacles such as that shown in my Patent No. 1,027,715 for feed, for litter and the like, each having its own bail 25 may be quickly attached to and detached from the hooks 24$^b$, thereby obviating the necessity of supplying an entire carrier for each individual receptacle as has heretofore been done.

As shown in Figs. 1 and 7 the gear 26 is bolted to the shaft 20 and meshes with a pinion 27 which is journaled on the pin 28, the latter being carried by the bearing 15. The pinion 27 is secured to the gear 29 which meshes with the gear 30. The latter is formed on the hub of the chain sheave 31 which is journaled on the end of the shaft 20. A bearing member 32 is journaled on the shaft 20 outside the chain sheave 31 and is secured to the bracket 15$^a$ by means of a screw 33.

The chain sheave 31 has an annular groove 34 from which extend recesses 35 at regular intervals of a size and form to accommodate the chain 36. The chain 36 passes thru the chain guides 37 and 38 which are preferably made integral with the bracket 15$^a$. A pawl 39 is hingably mounted on the cap screw 33 and has a rounded shoulder 40 adapted to engage the depressions 35 in the chain sheave 31. The pawl is normally held in engagement with the sheave by the spring 41. An extension 42 on the pawl 39 is adapted to be formed in the annular groove 34 and to serve as a brake on the chain sheave 31. An operating chain 43 is connected to the pawl and another chain 44 connects the pawl with an operating lever 45 which is hingably mounted at 46 and thru which passes the chain 36.

When it is desired to raise the carrier frame 25 the operator pulls down on the part of the chain 36 passing thru the operating lever 45. By pulling this chain to the right, the chain 44 withdraws the pawl 39 and permits the chain sheave 31 to turn without touching the rounded end 40. In the same way where it is desired to lower the carrier frame somewhat this same side of the chain 36 may be drawn by the operator to the right thereby releasing the pawl 39, when the chain 44 will be fed toward the chain sheave thereby permitting the weight of the carrier frame to turn the shaft 20 so as to lower it.

The carrier frame may also be lowered by pulling upon the chain 43 thereby releasing the pawl 39 when the weight of the carrier will cause it to descend. By pulling the chains 43 further the brake shoe 42 will engage the groove 34 thereby permitting the operator to lower the carrier at any speed desired.

Referring now to Figs. 1 and 4 it will be seen that the weight of the carrier is divided between the chains 21$^b$ and the bearings 15. This method of mounting the bearing 15 in the truck 14 permits the hanger to turn freely so as to accommodate itself to any bends in the track 10. The weight, however, on the chain 21$^b$ tends always to bring the trucks 14 back into alignment.

While I have shown and described but a single embodiment of my invention, it is to be understood that it is capable of many more modifications. Changes, therefore, in the construction and arrangement may be made which do not depart from the scope of the appended claims in which it is my intention to claim all novelty inherent in my invention as broadly as possible in view of the prior art.

What I claim as new and desire to secure by Letters Patent is:

1. In combination, an overhead track, trucks adapted to run on said track, a container, a chain at each side of each of said trucks and attached thereto at their upper ends, said chains being connected at their lower ends by an evener, said container being swung from the middle of said evener so that the weight of the container will tend to maintain the trucks in aligned positions.

2. In combination, an overhead track, trucks adapted to run on said track, a horizontal shaft, bearings for said shaft and means flexibly suspending each bearing from its truck at a point above the axis of said shaft, each bearing having rollers journalled thereon upon which said shaft rolls.

3. In combination, an overhead track, trucks adapted to run on said track, a horizontal shaft, bearings for said shaft, means flexibly connecting said bearing to its truck at a point above the axis of said shaft, each bearing carrying rollers upon which said shaft rolls eveners suspended from said trucks, a chain suspended from each of said eveners, the opposite ends of said chains being attached to said shaft and a container bail suspended from said chains.

4. In a hoist for litter carriers, trucks, a shaft, bearings for said shaft carried by said trucks, chains each having one end wound on said shaft, the opposite ends of said chains being supported by said trucks, a container frame suspended on said chains, a chain pulley journaled on said shaft, said pulley being geared to drive said shaft and means for locking said shaft against rotation.

5. In a hoist for litter carriers, trucks, a shaft, bearings for said shaft carried by said trucks, chains having adjacent ends wound on said shaft, the opposite ends of said chains being supported by said trucks, a carrier frame suspended on said chains, a chain pulley journaled on said shaft, said pulley being geared to drive said shaft and a pawl adapted to engage said chain pulley to prevent rotation of the shaft.

6. In a hoist for litter carriers, trucks, a shaft, bearings for said shaft carried by said trucks, chains having adjacent ends wound on said shaft, the opposite ends of said chains being supported by said trucks, a carrier frame suspended on said chains, a chain pulley journaled on said shaft, said pulley being geared to drive said shaft, a pawl adapted to engage said chain pulley to prevent rotation of the shaft, and a means operable by the chain running over said chain pulley to release said pawl.

7. In a hoist for litter carriers, trucks, a shaft, bearings for said shaft carried by said trucks, chains having adjacent ends wound on said shaft, the opposite ends of said chains being supported by said trucks, a carrier frame suspended on said chains, a chain pulley journaled on said shaft, said pulley being geared to drive said shaft, means for locking said shaft against rotation, a brake member connected to said pawl and adapted to engage said chain pulley and a control means for releasing said pawl and applying said brake.

HENRY L. FERRIS.